(12) United States Patent
Hamilton et al.

(10) Patent No.: US 8,755,921 B2
(45) Date of Patent: Jun. 17, 2014

(54) CONTINUOUS AUDIO INTERACTION WITH INTERRUPTIVE AUDIO

(75) Inventors: Robert Hamilton, London (GB); Bjorn Bringert, Bath (GB)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 12/793,065

(22) Filed: Jun. 3, 2010

(65) Prior Publication Data
US 2011/0301728 A1    Dec. 8, 2011

(51) Int. Cl.
*G06F 17/00*    (2006.01)
*H04H 40/00*    (2008.01)

(52) U.S. Cl.
USPC ............................................ 700/94; 455/3.06

(58) Field of Classification Search
USPC ................... 700/94; 348/484, 485, 515, 512; 386/229, 241, 220; 455/3.06
See application file for complete search history.

(56) References Cited

U.S. PATENT DOCUMENTS

| | | | |
|---|---|---|---|
| 5,953,485 A | 9/1999 | Abecassis | |
| 6,360,053 B1* | 3/2002 | Wood et al. | 386/343 |
| 6,876,845 B1* | 4/2005 | Tabata et al. | 455/344 |
| 7,017,120 B2 | 3/2006 | Shnier | |
| 7,178,047 B2 | 2/2007 | Chandley | |
| 7,466,334 B1* | 12/2008 | Baba | 348/14.06 |
| 7,609,173 B2 | 10/2009 | Vanderwall et al. | |
| 7,610,202 B1 | 10/2009 | Tipton et al. | |
| 7,721,032 B2* | 5/2010 | Bushell et al. | 710/240 |
| 2002/0069218 A1 | 6/2002 | Sull et al. | |
| 2002/0098878 A1 | 7/2002 | Mooney et al. | |
| 2002/0111812 A1* | 8/2002 | Buchholz et al. | 704/278 |
| 2005/0239446 A1* | 10/2005 | Tagawa et al. | 455/414.1 |
| 2006/0083388 A1 | 4/2006 | Rothschild | |
| 2007/0113182 A1* | 5/2007 | Hollemans | 715/723 |
| 2007/0139558 A1* | 6/2007 | Reineke | 348/571 |
| 2008/0120616 A1 | 5/2008 | James et al. | |
| 2009/0204719 A1 | 8/2009 | Simongini et al. | |

FOREIGN PATENT DOCUMENTS

WO    2005/112393 A1    11/2005
WO    2009/144364 A1    12/2009

OTHER PUBLICATIONS

International Search Report and Written Opinion for International Patent Application No. PCT/US2011/037728, mailed on Aug. 26, 2011, 13 pages.

* cited by examiner

*Primary Examiner* — Davetta W Goins
*Assistant Examiner* — Daniel Sellers
(74) *Attorney, Agent, or Firm* — Leydig, Voit & Mater, Ltd.

(57) ABSTRACT

According to an example implementation, a method may include playing, by a computing device, first audio generated by a first application, determining that the first audio generated by the first application should be interrupted based on a notification associated with a second application, pausing the first audio generated by the first application, playing interruptive audio generated by the second application during the pausing of the first audio, identifying a portion of the first audio that was previously played before the first audio was paused, and resuming the playing of the first audio so that the portion of the first audio that was previously played is replayed.

39 Claims, 6 Drawing Sheets

CONTINUOUS AUDIO INTERACTION WITH INTERRUPTIVE AUDIO

TECHNICAL FIELD

This description relates to audio output devices.

BACKGROUND

Devices may output or play continuous audio, such as podcasts, audio books, movies, or music. This continuous audio may be interrupted by time-sensitive or interruptive audio applications of the devices, such as incoming telephone calls. Transferring from the continuous audio to the interruptive audio and back to the continuous audio may lose the context or continuity of the continuous audio.

SUMMARY

According to one general aspect, method may include playing, by a computing device, continuous or first audio generated by a first application; determining that the first audio generated by the first application should be interrupted based on an interrupt or interruptive notification associated with a second application; pausing the continuous or first audio generated by the first application; playing interruptive audio generated by the second application during the pausing of the continuous or first audio; identifying a portion of the continuous or first audio that was previously played before the first audio was paused; and resuming the playing continuous or first audio so that the portion of the first audio that was previously played is replayed.

According to another general aspect, an apparatus may include at least one processor and at least one memory. The at least one memory may include computer executable code that, when executed by the at least one processor, is configured to cause the apparatus to play continuous or first audio generated by a first application; determine that the continuous or first audio generated by the first application should be interrupted based on an interrupt or interruptive notification associated with a second application; pause the playing continuous or first audio generated by the first application; play interruptive audio generated by the second application during the pausing of the continuous or first audio; identify a portion of the continuous or first audio that was previously played before the continuous or first audio was paused; and resume the playing of the continuous or first audio so that the portion of the continuous or first audio that was previously played is replayed.

According to another general aspect, a non-transitory computer-readable storage medium may include computer-executable code stored thereon that, when executed by a processor, is configured to cause an application executed by the processor to play continuous or first audio; receive a temporary interrupt or interruption message from an operating system executed by the processor; pause the playing the continuous or first audio based on receiving on the temporary interrupt or interruption message; receive a resume message from the operating system; identify a portion of the continuous or first audio that was previously played before the continuous or first audio was paused; and resume playing the continuous or first audio based on receiving the resume notification, the resuming including replaying a portion of the continuous or first audio which was playing before the pause or playing the continuous or first audio based on receiving the resume notification so that the portion of the first audio that was previously played is replayed.

According to another general aspect, a method may include determining, by a first computing device, to interrupt playing of continuous or first audio by a second computing device based on receiving a prompt; sending a pause message to the second computing device based on the determining, the pause message instructing the second computing device to pause playing the continuous or first audio; playing interruptive audio after sending the pause message; and sending a resume message to the second computing device after playing the interruptive audio, the resume message instructing the second computing device to resume playing the continuous or first audio.

According to another general aspect, an apparatus may include at least one processor and at least one memory. The at least one memory may include computer executable code that, when executed by the at least one processor, is configured to cause the apparatus to determine to interrupt playing of continuous or first audio by a computing device based on receiving a prompt; send a pause message to the computing device based on the determining, the pause message instructing the computing device to pause playing the continuous or first audio; play interruptive audio after sending the pause message; and send a resume message to the computing device after playing the interruptive audio, the resume message instructing the computing device to resume playing the continuous or first audio.

According to another general aspect, a non-transitory computer-readable storage medium may include computer-executable code stored thereon that, when executed by a processor, is configured to cause an application executed by the processor to determine to interrupt playing of continuous or first audio by a computing device based on receiving a prompt; send a pause message to the computing device based on the determining, the pause message instructing the computing device to pause playing the continuous or first audio; play interruptive audio after sending the pause message; and send a resume message to the computing device after playing the interruptive audio, the resume message instructing the computing device to resume playing the continuous or first audio.

The details of one or more implementations are set forth in the accompanying drawings and the description below. Other features will be apparent from the description and drawings, and from the claims.

DETAILED DESCRIPTION

Figure 1:
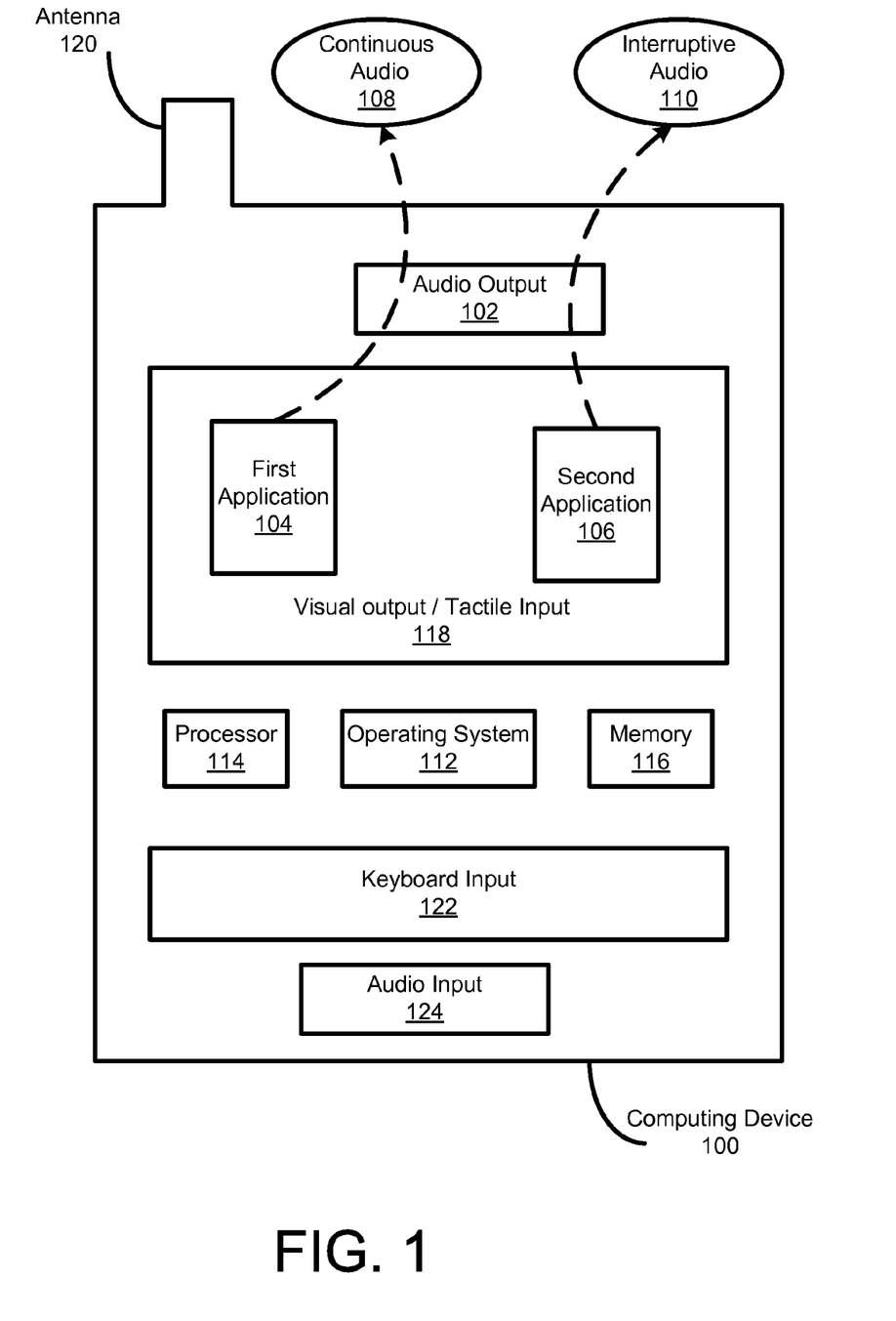
FIG. 1 is an exemplary block diagram of a computing device according to an example implementation.

FIG. 1 is an exemplary block diagram of a computing device 100 according to an example implementation. The computing device 100 may include, for example, a smart phone, a personal digital assistant (PDA), a cellular phone with computing features and/or multiple application features, an iPhone®, or a Droid® smartphone, according to example implementations. The computing device 100 may be capable of running or performing multiple software applications at the same time. The computing device 100 may perform more than one application at a given time; however, the computing device 100 may have to allocate shared resources between the multiple applications.

The computing device 100 may include an audio output 102. The audio output 102 may include, for example, a speaker, and may play audio and/or provide different kinds of audio output based on applications executed by the computing device 100. The audio output 102 may, for example, play or provide continuous or first audio output, which is non-time sensitive, but which provides audio output which is listened to by a user of the computing device 100 over an extended period of time. The continuous or first audio played or output by the audio output 102 may include, for example, playing podcasts, the sound portions of movies, audio books, or music. The continuous or first audio output may be based on an application executed by the computing device 100.

The audio output 102 also may play and/or output interruptive audio. Interruptive audio may include time sensitive audio output which is listened to for a shorter period of time. The interruptive audio may include, for example, a notification of emails, text messages or calendar alerts, the speech output of a turn-by-turn navigation application, the notification of a phone call, or the voice output of a phone call itself. The interruptive audio may be based on another application executed by the computing device 100.

The computing device 100 may allocate the resources of the audio output 102 so that two applications are not playing and/or providing output out of the audio output 102 at the same time. The computing device 100 may, for example, allow interruptive audio to take priority over continuous or first audio.

The computing device 100 may include multiple applications. The multiple applications of the computing device 100 may provide continuous or first audio output and/or interruptive audio output. The computing device 100, as shown in FIG. 1, includes two applications, a first application 104, and a second application 106; however, the computing device 100 may include any number of applications.

In the example shown in FIG. 1, the first application 104 may play and/or output continuous or first audio 108 via the audio output 102. The first application 104 may include, for example, an audio player such as a podcast player, an audio book player or music player, or may include a movie player which has both a video and an audio output component. The first application 104 may play and/or output the continuous or first audio 108 via the audio output 102.

The second application 106 may include an application which plays and/or outputs interruptive audio 110. The second application 106 may include, for example, an email program, a text message program, a calendar program which provides audio alerts, a turn-by-turn navigation application which provides audio output of turns (such as, "turn left in one hundred feet"), or a telephone application which provides a notification of incoming phone calls and also plays and/or outputs the speech received by the computing device 100. The second application 106 may play and/or output the interruptive audio 110 via the audio output 102.

A problem may arise when the first application 104 is playing and/or outputting the continuous or first audio 108 via the audio output 102 and the second application 106 needs to play and/or output the interruptive audio 110 via the audio output 102; allowing both the first application 104, and the second application 106, to play and/or output their respective audio outputs at the same time, may result in neither of the outputs 108, 110 being intelligible and/or one or both of the outputs 108, 110 being drowned out. Thus, the computing device 100 may need to prioritize between allocating the shared resource of the audio output 102 between the audio outputs 108, 110 of the first application 104 and the second application 106.

The computing device 100 may include an operating system 112. The operating system 112 may not necessarily be seen by, or visible to, a user of the computing device 100. The operating system 112 may allocate the resources of the computing device 100 between the different applications in the computing device 100, such as the first application 104 and the second application 106. The resources of the computing device 100 may include, for example, the audio output 102, a processor 114, such as a microprocessor, a memory 116, and input and output components of the computing device 100. The processor 114 may execute instructions, such as the instructions stored in the memory 116, may run applications, such as the applications 104, 106, and/or may receive input and provide output from and to the input and output devices described herein. The memory 116, which may include any type of memory, such as read only memory (ROM), random access memory (RAM), and/or flash memory, may store program instructions and/or data. The operating system 112 may, for example, allocate processor 114 resources, memory 116 resources, and/or the audio output 102 resource between the first application 104 and the second application 106. The operating system 112 also may receive and send messages from and to the first application 104 and the second application 106, discussed further below.

The operating system 112 may act as an interface between the applications, such as the first application 104 and the second application 106, and the resources of the computing device 100. Input and output resources of the computing device 100 may include, for example, a visual output and/or tactile input 118. The visual output and/or tactile input 118 may include, for example, a display which may display graphical icons, notifications, video, and other graphical outputs. The visual output/tactile input 118 also may receive input from a user, such as by providing a touch screen in the computing device 100.

The input and output resources of the computing device 100 also may include an antenna 120. The antenna 120 may extend out of the computing device 100, or may be internal to the computing device 100. The antenna 120 may serve to receive and transmit wireless signals between the computing device 100 and other computing devices, such as base stations, cellular towers, access points, node B's, or other devices which serve mobile computing devices, or even other mobile computing devices.

The input and output resources of the computing device 100 also may include a keyboard input 122. The keyboard input 122 may receive text input from a user. While the computing device 100 shown in FIG. 1 includes a keyboard input 122, the computing device 100 need not necessarily include the keyboard input 122. The computing device 100 may instead (or also) receive text input via a touch screen, such as the visual output/tactile input 118.

The input and output resources of the computing device 100 also may include an audio input 124. The audio input 124 may include, for example, a microphone which receives audio input such as speech from a user of the computing device. The operating system 112 may interface between the applications 104, 106 and any or all of the input and output resources of the computing device 100, such as, but not limited to, the audio output 102, visual output/tactile input 118, antenna 120, keyboard input 122, and audio input 124.

The operating system 112 may, for example, determine to temporarily interrupt the continuous or first audio 108 generated by the first application 104 based on an interrupt or interruptive notification associated with the second application 106. Based on the interruption, the first application 104 may pause the continuous or first audio 108. The second application 106 may generate the interruptive audio 110 during the pausing of the continuous or first audio 108. After the interruptive audio 110 has completed, the first application 104 may resume playing and/or outputting the continuous or first audio 108. However, simply resuming at the point where the first application 104 paused playing and/or outputting the continuous or first audio 108 may result in a loss of context or continuity of the continuous or first audio 108. Therefore, the first application 104 may identify a portion of the continuous or first audio 108 that was previously played or outputted before the continuous or first audio 108 was paused. The first application 104 may identify the portion by determining a time, such as five second or ten seconds, which should be replayed, or identifying a complete sentence or a scene which was interrupted and which should be replayed, according to example embodiments. The first application 104 may replay and/or re-output or regenerate a portion of the continuous or first audio 108 which was output or generated before the pausing or interruption, and/or resume playing of the continuous or first audio 108 so that the portion of the continuous or first audio 108 that was previously played is replayed, regaining the context of the continuous or first audio 108.

Figure 2:
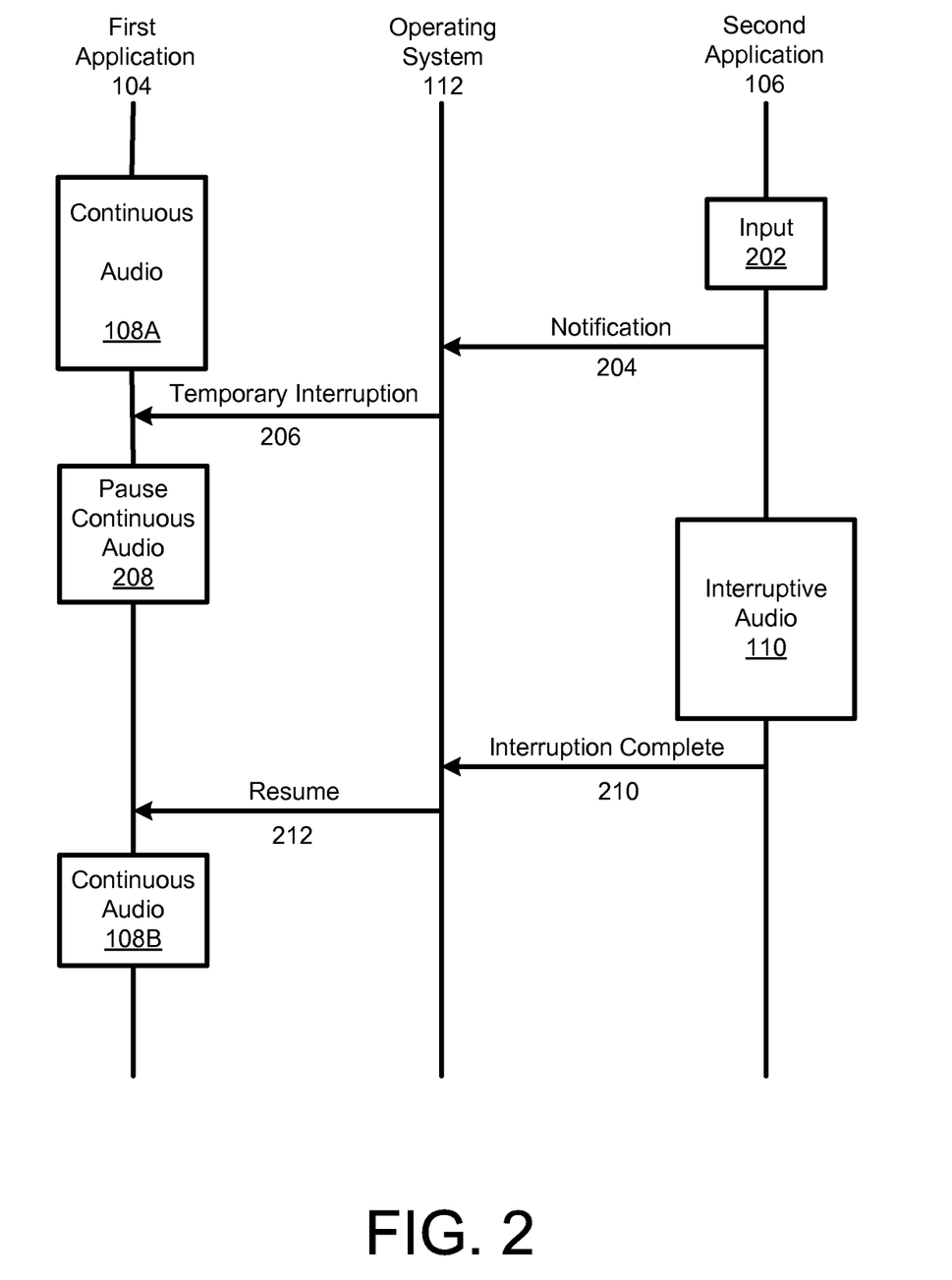
FIG. 2 is a vertical-time sequence diagram showing actions performed by, and messages exchanged between, a first application, an operating system, and a second application of the computing device shown in FIG. 1.

FIG. 2 is a vertical-time sequence diagram showing actions performed by, and messages exchanged between, the first application 104, the operating system 112, and the second application 106. In the example shown in FIG. 2, the first application 104 may be playing and/or outputting continuous or first audio 108A. The continuous or first audio 108A may include, for example, a podcast, an audio book, music, or the sound portion of a movie.

While the first application 104 is playing and/or outputting the continuous or first audio 108A, the second application 106 may receive input 202 or a prompt. The input 202 or prompt may include, for example, a notification of a telephone call received via the antenna 120, an input from a user of the computing device 100 (which may have been received via the visual output/tactile input 118, the keyboard input 122, or the audio input 124), a notification that a time of a calendar alert has come, or a determination by a turn-by-turn navigation program that a turn instruction should be provided to the user (which may be based on information included in the turn-by-turn navigation program combined with global positioning system (GPS) information).

Upon receiving the input 202, the second application 106 may determine that the second application 106 should provide, generate, play, or output interruptive audio 110. Based on this determination, the second application 106 may send an interrupt or interruptive notification message 204 to the operating system 112. The interrupt or interruptive notification message 204 may be a notification understood by the operating system 112 to indicate that the second application 106 needs to provide interruptive audio output 110.

The operating system 112 may receive the interrupt or interruptive notification message 204 from the second application 106. The operating system 112 may understand that the interrupt or interruptive notification message 204 indicates that the second application 106 needs to provide, generate, play, or output interruptive audio 110. The operating system 112 may have stored or determined that the first application 104 is providing the continuous or first audio output 108A. The operating system 112 may, for example, have previously pushed the first application 104 onto a top of a "stack," giving the first application 104 priority to the audio output 102. Based on receiving the interrupt or interruptive notification message 204, and determining and/or having stored the fact that the first application 104 is providing the continuous or first audio 108, the operating system 112 may push the second application 106 onto the top of the stack, and/or send a temporary interruption message 206 to the first application 104.

The first application 104 may receive the temporary interruption message 206 from the operating system 112. The first application 104 may understand that the temporarily interruption message 206 indicates that another application, such as the second application 206, needs to play and/or output interruptive audio 110. Based on receiving the temporary interruption message 206, the first application 104 may pause the continuous or first audio (208). The first application 104 may identify a portion of the continuous or first audio 108A that was previously played before the pausing which should be replayed. The identifying the portion to replay by the first application 104 may include, for example, pausing the continuous or first audio, and/or setting a pointer to, a point at which the continuous or first audio 108A was stopped (such as when the first application 104 received the temporary interruption message 206) and/or at a tag preceding the point at which the continuous or first audio 108A was paused. Examples of storing the point at which the continuous or first audio 108A was paused or the location of the tag preceding the point at which the continuous or first audio 108A was paused include storing a bookmark, time stamp, frame count, position, or sample number of the audio file corresponding to the continuous or first audio output 108A.

In an example in which the continuous or first audio output 108A is streamed to the computing device 100, such as via the antenna 120, the computing device 100 and/or first application 104 may store and/or buffer the streamed data during the pausing for later output, or may send a message to a sending device, such as a server, to pause and/or back up or rewind the streamed content, according to example implementations. The first application 104 may continue generating the continuous or first audio output 108A for some period of time to enable buffering and subsequent continuation of the streaming, or may buffer during the entire time during which the continuous or first audio output 108A is paused, according to example implementations.

The continuous or first audio 108A may, for example, have been tagged with sentence beginnings, and/or the first application 104 may determine a tag of the continuous or first audio 108A. The tag may have been included in the file from which the first application 104 generated the continuous or first audio output 108A, or the first application 104 may find a boundary and/or endpoint of the continuous or first audio 108A, such as based on pauses or audio energy, sentence boundary detection, end points, speech recognition, based on a transcript (such as alignment or tagging of the continuous or first audio output 108A with the text transcript), based on content indexing, tokenizations (such as by detecting word boundaries), and/or based on a transcript of the text. In the example in which the first application 104 is providing video along with the audio output, the first application 104 may tag the output (which may include both the video output and the continuous or first audio output 108A) based on a beginning of a scene, which may, for example, be based on a change in the video output. The first application 104 may point to and/or store that tag point. In the example in which the first application 104 and/or the computing device 100 has stored the entire contents of the continuous or first audio output 108 which will be played and/or outputted, the first application 104 may store the point at which the continuous or first audio output will resume based on the tag. The data which the first application 104 will read to generate the continuous or first audio output 108A may, for example, be maintained in a continuous or first or circular buffer (which may be included in the memory 116), allowing the first application 104 to return to the tag or other point at which the first application 104 will resume the continuous or first audio output 108A. In an example in which the computing device 100 is receiving the data in a stream which will be played and/or outputted as continuous or first audio output 108A, the first application 104 and/or the computing device 100 may store the streamed data for later output.

The first application 104 may pause the continuous or first audio 108A by immediately ceasing play and/or output of the continuous or first audio 108A, or may gradually reduce the volume of the continuous or first audio output, such as by fading the continuous or first audio output 108A by gradually lowering the volume of the continuous or first audio output. This may provide a more gradual and/or seamless transition from the continuous or first audio 108A to the interruptive audio 110.

At about the same time that the first application 104 pauses the continuous or first audio output (208), the second application 106 may play and/or output the interruptive audio output 110. The second application 106 may play and/or output the interruptive audio 110, such as by providing the audio notification of the email, text message or calendar alert, by providing the speech output or turn direction of the navigation program, and/or by providing the ring and the speech output of a telephone call. The second application 106 may complete the interruptive audio 110, such as the email notification and/or text-to-speech output of the email notification, text message, or calendar output, or providing the full turn direction of the turn-by-turn navigation program, and/or by completing the telephone call.

Upon completing the interruptive audio 110, the second application 106 may send an interruption complete message 210 to the operating system 112. The interruption complete message 210 may inform the operating system 112 that the second application 106 has completed playing and/or outputting the interruptive audio output 110, and the operating system 112 may pop the second application 106 off the top of the stack, and/or reallocate the audio output resources to the first application 104. The first application 104 may now be back on top of the stack.

The operating system 112 may have stored and/or determined which application, such as the first application 104, had its continuous or first audio output 108 paused during the interruptive audio output 110, such as by checking the top of the stack. The operating system 112 may, in response to receiving the interruption complete message 210 and determining that the first application 104 was the application which had its continuous or first audio output 108 paused, send a resume message 212 to the first application 104.

The first application 104 may receive the resume message 212 from the operating system 112. The first application 104 may determine and/or know that the resume message 212 provides permission and/or authorization for the first application 104 to resume playing and/or outputting continuous or first audio 108B.

The first application 104 may respond to receiving the resume message 212 by resuming playing and/or outputting continuous or first audio 108B. The first application 104 may resume playing and/or outputting the continuous or first audio 108B by fading the continuous or first audio 108B in, gradually increasing the volume until returning to the full volume, or may immediately play and/or output or generate the continuous or first audio 108B at full volume.

The resuming may include replaying and/or re-outputting a portion of the continuous or first audio 108A, 108B which was played and/or outputted by the first application 104 before the pausing of the continuous or first audio (208). The first application 104 may, for example, replay and/or re-output the portion of the continuous or first audio by playing and/or outputting a complete sentence or a complete portion or portion beginning with the most recent tag of a file read by the first application 104. Replaying and/or re-outputting the portion of the continuous or first audio 108 which was generated, played, or output by the first application 104 may provide context and continuity to a user of the computing device 100. Thus, instead of the first application 104 pausing the continuous or first audio 108A in mid-sentence and continuing the continuous or first audio 108B in the middle of the same sentence, the first application 104 may replay and/or re-output the same entire sentence and/or some preceding sentences, giving the user or listener of the computing device 100 the context of the continuous or first audio 108B. If the first application 104 was playing and/or outputting the continuous or first audio 108A by receiving a live stream via the antenna 120, the first application 104 may play and/or output continuous or first audio 108B which was previously received via the stream (which was stored in the buffer and/or memory 116 and subsequently read out of the buffer and/or memory 116), and the continuous or first audio 108B may be delayed from the received stream, according to an example implementation.

The process described with reference to FIG. 2 may be performed automatically, and/or without user interaction or instruction. For example, the first application 104 may be playing and/or outputting the continuous or first audio 108A, such as a podcast, when the input 202, such as a phone call, prompts the second application 106 to interrupt the continuous or first audio 106A of the first application 104 (such as by the interrupt or interruptive notification message 204 and temporary interruption message 206). The first application 104 may pause the continuous or first audio (208), such as by pausing the podcast, while the second application 106 plays and/or outputs the interruptive audio 110, such as the ring or ringtone associated with the telephone call. If a user of the computing device 100 does not answer the call (such as by not providing input to the computing device 100 in response to the ring or ringtone), then the interruptive audio 110 may be complete when the second application 106 has finished ringing, and the first application 104 may resume the continuous or first audio 108B (such as based on the interruption complete message 210 and the resume message 212). If the user does answer the call, such as by providing an input into the computing device 100 instructing the computing device 100 to take the call, then the interruptive audio 110 may continue until the user instructs the computing device 100 to finish the call or the computing device 100 receives input from another source (such as a wireless signal) that the call is complete. In other examples of the second application 106, such as calendar alerts or turn-by-turn navigation programs, the second application 106 may generate and finish the interruptive audio 110 without user input.

Figure 3:
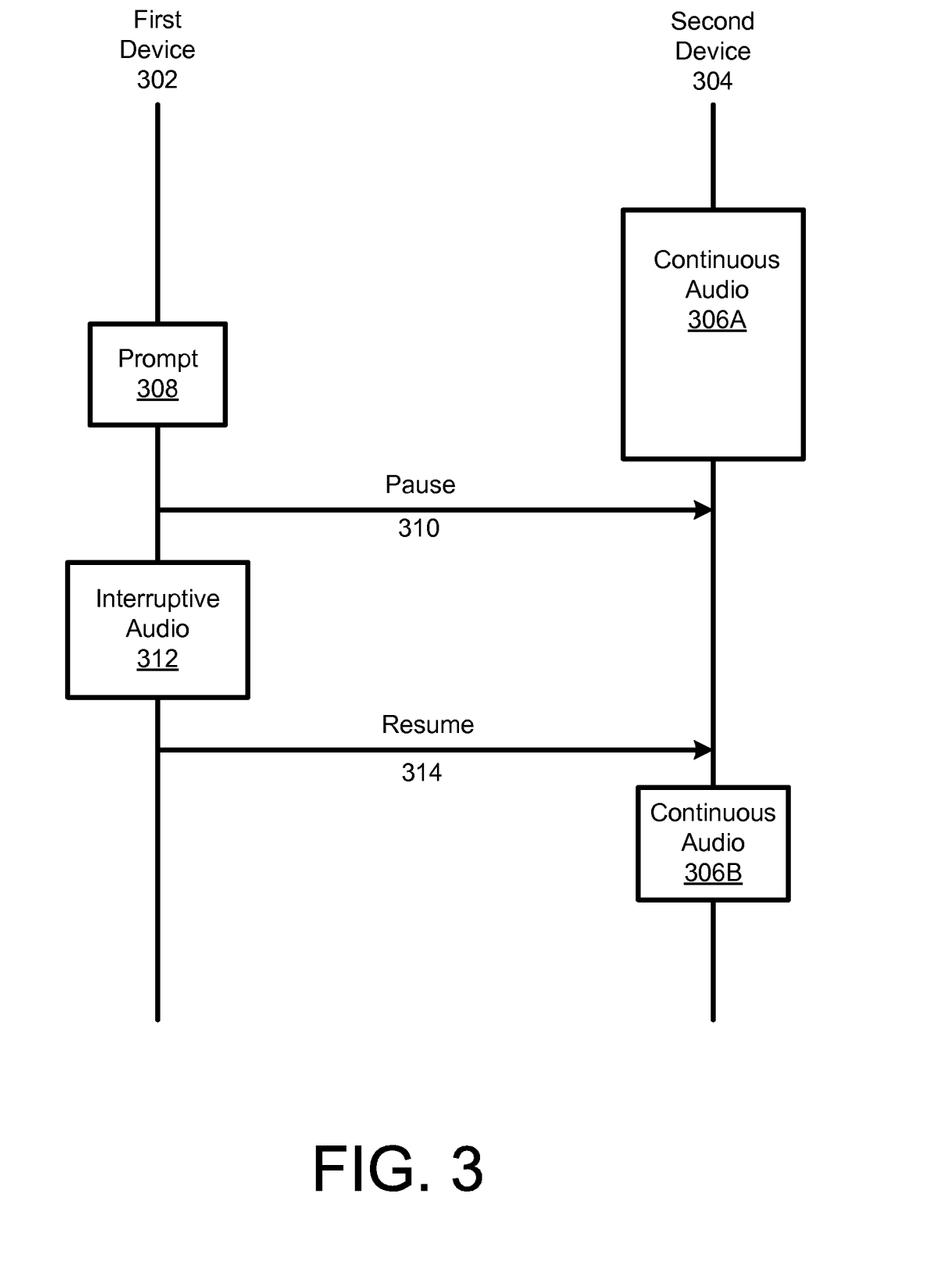
FIG. 3 is a vertical-time sequence diagram showing messages sent between, and outputs provided by, a first device and a second device.

FIG. 3 is a vertical-time sequence diagram showing messages sent between, and outputs provided by, a first device 302 and a second device 304. The first device 302 may be a device which outputs interruptive audio and may include, for example, a cellular phone, a smartphone, a PDA, an iPhone, a Droid smartphone, or a turn-by-turn navigation system. The second device 304 may include a device which plays and/or outputs continuous or first audio, such as, for example, a music player or MP3 player. The first device 302 and second device 304 may, for example, both be in an automobile.

In an example implementation, the second device 304 may include a car stereo system which plays music or outputs podcasts or audio books. In an example implementation, the first device 302 may be in wireless communication with the second device 304 such as via, for example, an IEEE 802.15 Bluetooth connection, an 802.11 IEEE wireless local area network (WLAN) connection, or other wireless connection. The first device 302 may be capable of sending instructions to the second device 304 via the wireless connection. The first device 302 may also be coupled to the second device 304 via a wired or guided connection, and may be capable of sending instructions to the second device 304 via the wired or guided connection.

In an example implementation, the second device 304 may play and/or output continuous or first audio 306A. The second device 304 may play and/or output the continuous or first audio 306A which may include, for example, a podcast or an audio book.

While the second device 304 is playing and/or outputting the continuous or first audio 306A, the first device 302 may receive a prompt 308. The prompt 308 may include, for example, a notification of an email, text message, calendar alert, or phone call, or a determination that a turn direction should be provided by a turn-by-turn navigation system. The prompt 308 may be based on a wireless signal received by the first device 302, based on a user input, or based on timing determinations and/or location determinations by the first device 302.

Based on the prompt 308, the first device 302 may send a pause message 310 to the second device 304. The pause message 310 may instruct the second device to pause playing and/or outputting the continuous or first audio 306A. The pause message 310 may, for example, include a pause message by a remote control interface for the second device 304.

In response to receiving the pause message 310, the second device 304 may pause playing and/or outputting the continuous or first audio 306A. After sending the pause message 310 to the second device 304, the first device 302 may play and/or output interruptive audio 312. The interruptive audio 312 may include, for example, a notification of an email, text message, calendar alert, or phone call, as well as the audio output of a phone call and/or a turn notification by a turn-by-turn navigation system.

After the interruptive audio output 312 is complete, such as after an email message, text message or calendar alert output has been provided, and/or after a phone call has been completed or a turn direction has been played and/or output, the first device 302 may send a resume message 314 to the second device 304. The resume message 314 may instruct the second device 304 to resume playing and/or outputting the continuous or first audio 306B. The resume message 314 may, for example, include a play or un-pause instruction by a remote control interface for the second device 306.

The second device 304 may receive the resume message 314 and respond to receiving the resume message 314 by resuming playing and/or outputting of the continuous or first audio 306B. In resuming playing and/or outputting the continuous or first audio 306B, the second device 304 may replay and/or re-output a portion of the continuous or first audio 306A which was played and/or output before receiving the pause message 310. Replaying and/or -outputting the portion of the continuous or first audio 306A may provide continuity and/or context in the outputting of the continuous or first audio 306A, 306B.

To facilitate the replaying and/or re-outputting of the portion of the continuous or first audio 306A by the second device 304, the pause message 310 and/or the resume message 314 may have included an instruction for the second device 304 to rewind the continuous or first audio 306A and/or to move to a previous portion where the continuous or first audio 306A will resume being played and/or outputted. The rewind may include rewinding a predetermined period of time such as one second, five seconds, or ten seconds, and/or may be based on a tag. For example, the first device 302 may have listened to the continuous or first audio output 306A and found a tag, such as a beginning of a sentence or a reduced volume, at which the second device 304 should resume playing and/or outputting the continuous or first audio 306B. The first device 302 may determine a time period before the pause message 310 at which time the tag began, and may instruct the second device 304 to rewind that period of time which will cause the second device 304 to resume playing and/or outputting the continuous or first audio 306B at the beginning or at the determined tag point, according to an example implementation. The first device 302 and/or second device 304 may include any or all of the components as the computing device 100 shown in FIG. 1, according to example implementations.

Figure 4:
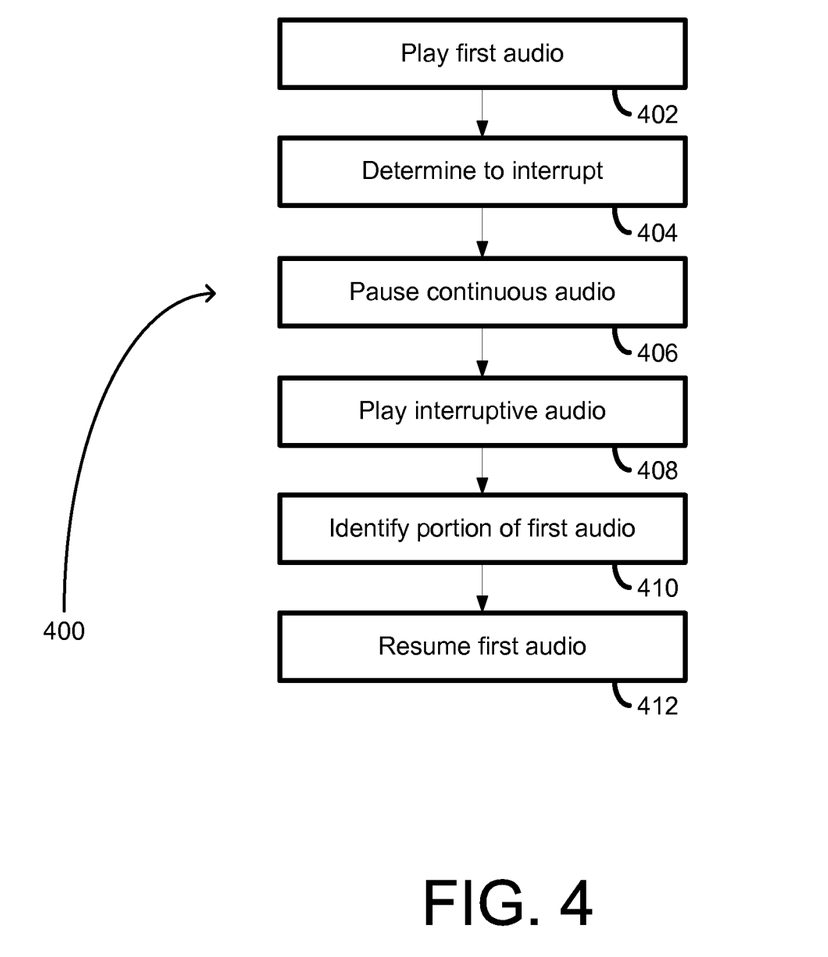
FIG. 4 is a flowchart of a method according to an example implementation.

FIG. 4 is a flowchart of a method 400 according to an example implementation. In this example, the method 400 may include playing and/or outputting, by a computing device 100, continuous or first audio 108 generated by a first application 104 (402), determining that the continuous or first audio 108 generated by the first application 104 should be interrupted based on an interrupt or interruptive notification 204 associated with a second application (404), pausing the continuous or first audio 108 generated by the first application 104 based on the determining (406), playing and/or outputting interruptive audio 110 generated by the second application 106 during the pausing of the continuous or first audio 108 (408), identifying a portion of the continuous or first audio 108 that was previously played before the first audio was paused (410), and resuming the playing and/or outputting continuous or first audio 108 generated by the first application 104, the resuming including replaying and/or re-outputting a portion of the continuous or first audio 108 which was generated by the first application 104 before the pausing, and/or resuming playing of the continuous or first audio 108 so that the portion of the continuous or first audio 108 that was previously played is replayed (412).

In an example implementation, the playing and/or outputting continuous or first audio 108 (402) may include playing and/or outputting continuous or first audio 108 and continuous or first video generated by the first application 104, and the resuming may include resuming the playing and/or outputting continuous or first audio 108 and continuous or first video generated by the first application 104, the resuming including replaying and/or re-outputting the portion of the continuous or first audio 108 and a portion of the continuous or first video which were generated by the first application 104 before the pausing.

In an example implementation, the interrupt or interruptive notification 204 associated with the second application 106 may be based on a user input received by the computing device 100.

In an example implementation, the interrupt or interruptive notification 204 associated with the second application 106 may be based on the computing device receiving a wireless signal.

In an example implementation, the second application 106 may include a phone or telephone application.

In an example implementation, the second application 106 may include a navigation application.

In an example implementation, the pausing (406) may include gradually reducing a volume of the playing and/or outputting the continuous or first audio 108 generated by the first application 104, and the resuming may include gradually increasing the volume of the playing and/or outputting the continuous or first audio 108 generated by the first application 104.

In an example implementation, the pausing (406) may include storing streamed data read by the first application 104 while pausing the playing and/or outputting continuous or first audio 108 generated by the first application 104, and the resuming may include playing and/or outputting continuous or first audio 108 based on the stored streamed data.

In an example implementation, the resuming (412) may include resuming the playing and/or outputting continuous or first audio 108 generated by the first application 104, the resuming including replaying and/or re-outputting a complete sentence which was interrupted by the pausing (406).

In an example implementation, the resuming (412) may include resuming the playing and/or outputting continuous or first audio 108 generated by the first application 104, the resuming including replaying and/or re-outputting a complete sentence which was interrupted by the pausing (406), the complete sentence being determined by content indexing.

In an example implementation, the resuming (412) may include resuming the playing and/or outputting continuous or first audio 108 generated by the first application 104, the resuming beginning at a most recent tag in a file read by the first application 104.

In an example implementation, the playing and/or outputting (402) may include playing and/or outputting continuous or first audio and continuous or first video generated by the first application 104, and the resuming (412) may include resuming the playing and/or outputting continuous or first audio 108 and continuous or first video generated by the first application 104, the resuming including replaying and/or re-outputting the portion of the continuous or first audio and a portion of the continuous or first video at a beginning of a most recent scene which was generated by the first application 104 before the pausing (406).

Figure 5:
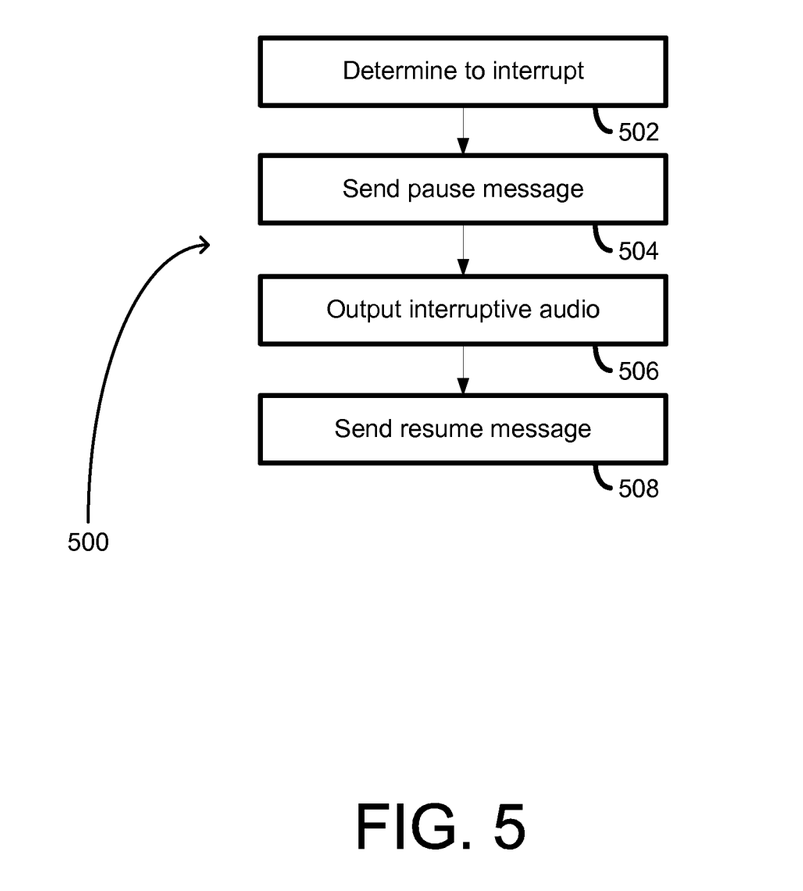
FIG. 5 is a flowchart of a method according to another example implementation.

FIG. 5 is a flowchart of a method 500 according to another example embodiment. In this example, the method may include determining, by a first computing device 302, to temporarily interrupt playing and/or outputting of continuous or first audio 306A by a second computing device 304 based on receiving a prompt (502), sending a pause message 310 to the second computing device 304 based on the determining, the pause message 310 instructing the second computing device 304 to pause playing and/or outputting the continuous or first audio (504), playing and/or outputting interruptive audio 312 after sending the pause message (506) and sending a resume message 314 to the second computing device 304 after playing and/or outputting the interruptive audio 312, the resume message 314 instructing the second computing device 304 to resume playing and/or outputting the continuous or first audio 306B (508).

In an example implementation, the pause message 310 may instruct the second computing device 304 to pause the playing and/or outputting and rewind the continuous or first audio 306A.

In an example implementation, the resume message 314 may instruct the second computing device 304 to rewind and resume the playing and/or outputting the continuous or first audio 306B.

Figure 6:
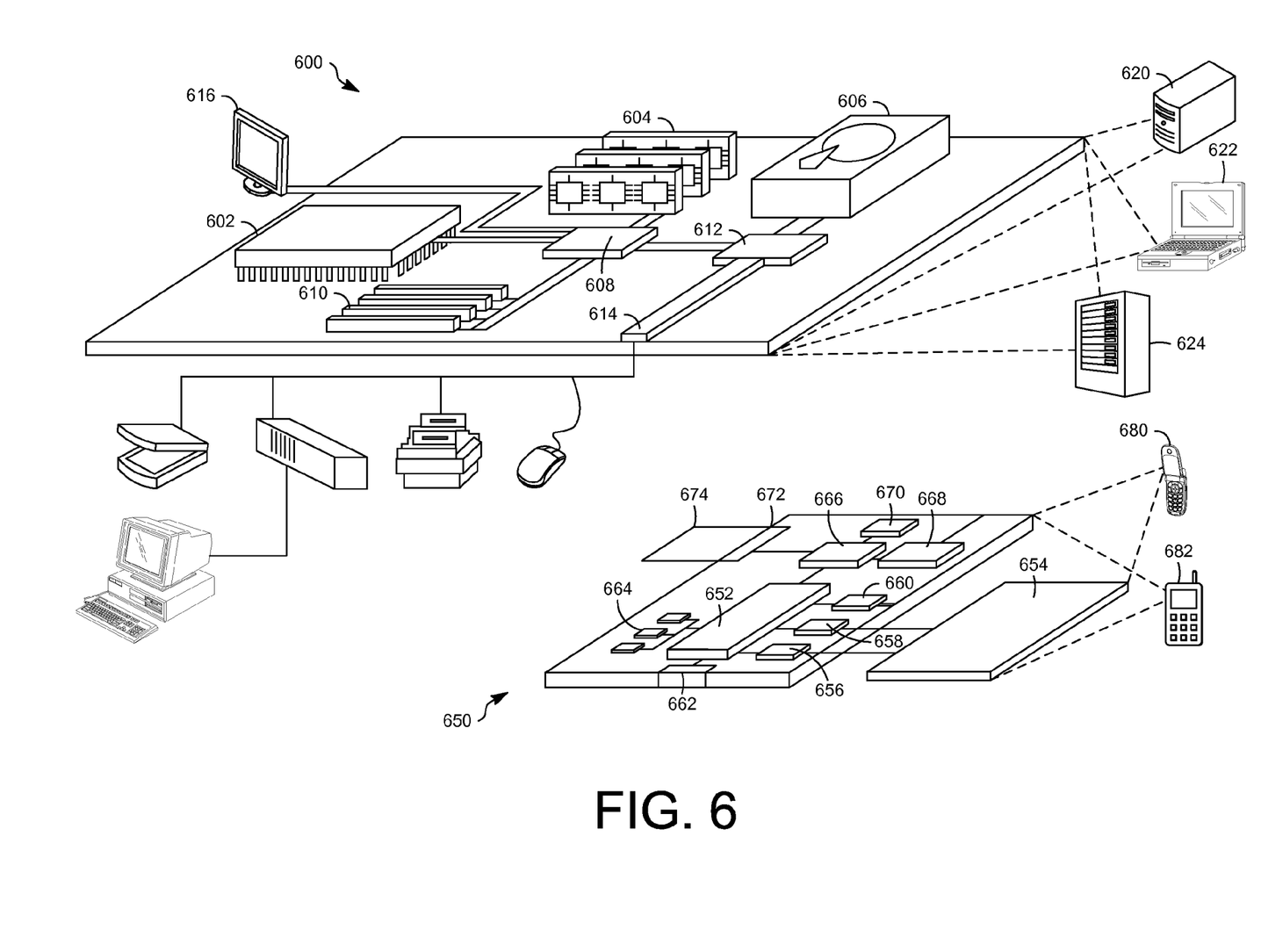
FIG. 6 is a block diagram showing example or representative computing devices and associated elements that may be used to implement the systems and methods of FIGS. 1-5.

FIG. 6 is a block diagram showing example or representative computing devices and associated elements that may be used to implement the systems and methods of FIGS. 1-5. FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning system) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in FIG. 6. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
outputting, by a first application, continuous audio corresponding to a file read by the first application, wherein the first application is executing on a computing device;
receiving, at the first application, an interruptive notification associated with a second application, wherein the interruptive notification corresponds to interrupting the continuous audio output by the first application;
pausing the outputting continuous audio by the first application based on receiving the interruptive notification;
analyzing, by the first application, the continuous audio to identify a portion of the continuous audio that was previously output to be re-output;
outputting interruptive audio associated with the interruptive notification and the second application during the pausing; and
in response to receiving, by the first application, a resume message upon completion of the interruptive audio, resuming the outputting continuous audio by the first application at a location associated with a most recent tag in the file read by the first application, the resuming including automatically re-outputting, without user interaction or instruction, the portion of the continuous audio identified by the first application, wherein the most recent tag in the file read by the first application is included in the file from which the first application outputs the continuous audio.

2. The method of claim 1, wherein:
the outputting continuous audio includes outputting continuous audio and continuous video generated by the first application;
the identifying includes identifying a portion of the continuous audio and a portion of continuous video that was previously output to be re-output;
the resuming includes resuming the outputting continuous audio and continuous video generated by the first application, the resuming including re-outputting the portion of the continuous audio and the portion of the continuous video identified by the first application.

3. The method of claim 1, wherein the interruptive notification associated with the second application is based on a user input received by the computing device.

4. The method of claim 1, wherein the second application includes a phone application.

5. The method of claim 1, wherein the second application includes a navigation application.

6. The method of claim 1, wherein:
the pausing includes gradually reducing a volume of the outputting the continuous audio; and
the resuming includes gradually increasing the volume of the outputting the continuous audio.

7. The method of claim 1, wherein:
the pausing includes storing streamed data read by the first application while pausing the outputting continuous audio; and
the resuming includes outputting continuous audio based on the stored streamed data.

8. The method of claim 1, wherein the tag is associated with a beginning of a complete sentence, and resuming includes re-outputting the complete sentence that was interrupted by the pausing, the complete sentence being determined by the first application based on content indexing.

9. The method of claim 1, wherein:
the outputting the continuous audio includes outputting the continuous audio and continuous video;
the identifying includes identifying a portion of the continuous audio and a portion of continuous video that was previously output to be re-output; and
the resuming includes resuming the outputting continuous audio and the continuous video, wherein the resuming includes re-outputting the portion of the continuous audio and the portion of the continuous video at a beginning of a most recent scene identified by the first application before the pausing, wherein the tag is associated with a beginning of the most recent scene is based on a change in video output.

10. The method of claim 1, wherein the resuming includes re-outputting a complete sentence of the continuous audio which was generated by the first application before the pausing and was interrupted by the pausing.

11. An apparatus comprising:
at least one processor; and
at least one memory comprising computer executable code that, when executed by the at least one processor, is configured to cause the apparatus to:
output, by a first application, continuous audio corresponding to a file read by the first application, wherein the first application is executed by the at least one processor;
receive, at the first application, an interruptive notification associated with a second application, wherein the interruptive notification corresponds to interrupting the continuous audio output by the first application;
pause the outputting continuous audio by the first application based on receiving the interruptive notification;
analyze, by the first application, the continuous audio to identify a portion of the continuous audio that was previously output to be re-output;
output interruptive audio associated with the interruptive notification and the second application during the pausing; and
in response to receiving, by the first application, a resume message upon completion of the interruptive audio, resume the outputting continuous audio by the first application at a location associated with a most recent tag in the file read by the first application, the resuming including automatically re-outputting, without user interaction or instruction, the portion of the continuous audio identified by the first application, wherein the most recent tag in the file read by the first application is included in the file from which the first application outputs the continuous audio.

12. The apparatus of claim 11, wherein:
the outputting continuous audio includes outputting continuous audio and continuous video generated by the first application;
the identifying includes identifying a portion of the continuous audio and a portion of continuous video that was previously output to be re-output;
the resuming includes resuming the outputting continuous audio and continuous video generated by the first application, the resuming including re-outputting the portion of the continuous audio and the portion of the continuous video identified by the first application.

13. The apparatus of claim 11, wherein the interruptive notification associated with the second application is based on a user input received by the apparatus.

14. The apparatus of claim 11, wherein the second application includes a phone application.

15. The apparatus of claim 11, wherein the second application includes a navigation application.

16. The apparatus of claim 11, wherein:
the pausing includes gradually reducing a volume of the outputting the continuous audio; and
the resuming includes gradually increasing the volume of the outputting the continuous audio.

17. The apparatus of claim 11, wherein:
the pausing includes storing streamed data read by the first application while pausing the outputting continuous audio; and
the resuming includes outputting continuous audio based on the stored streamed data.

18. The apparatus of claim 11, wherein the tag is associated with a beginning of a complete sentence, and resuming includes re-outputting the complete sentence that was interrupted by the pausing, the complete sentence being determined by the first application based on content indexing.

19. The apparatus of claim 11, wherein:
the outputting the continuous audio includes outputting the continuous audio and continuous video;
the identifying includes identifying a portion of the continuous audio and a portion of continuous video that was previously output to be re-output; and
the resuming includes resuming the outputting continuous audio and the continuous video, wherein the resuming includes re-outputting the portion of the continuous audio and the portion of the continuous video at a beginning of a most recent scene identified by the first application before the pausing, wherein the tag is associated with a beginning of the most recent scene is based on a change in video output.

20. The apparatus of claim 11, wherein the resuming includes re-outputting a complete sentence of the continuous audio which was generated by the first application before the pausing and was interrupted by the pausing.

21. A non-transitory computer-readable storage medium comprising computer-executable code stored thereon that, when executed by a processor, is configured to cause a computing device to:
output, by a first application, continuous audio corresponding to a file read by the first application, wherein the first application is executing on the computing device;
receive, at the first application, a temporary interruption message from an operating system executed by the processor, wherein the temporary interruption message corresponds to interrupting the continuous audio output by the first application;
pause the outputting the continuous audio based on receiving the temporary interruption message;
analyze, by the first application, the continuous audio to identify a portion of the continuous audio that was previously output to be re-output;
output interruptive audio associated with the temporary interruption message during the pausing;
receive, by the first application, a resume message from the operating system; and
resume outputting the continuous audio in response to receiving the resume message, the resuming including automatically re-outputting, without user interaction or instruction, the portion of the continuous audio identified by the first application beginning at a location associated with a most recent tag in the file read by the first application, wherein the most recent tag in the file read by the first application is included in the file from which the first application outputs the continuous audio.

22. The storage medium of claim 21, wherein:
the outputting continuous audio includes outputting continuous audio and continuous video;
the identifying includes identifying a portion of the continuous audio and a portion of continuous video that was previously output to be re-output;
the resuming includes resuming the outputting continuous audio and continuous video, the resuming including re-outputting the portion of the continuous audio and the portion of the continuous video identified by the first application.

23. The storage medium of claim 21, wherein:

the pausing includes gradually reducing a volume of the outputting the continuous audio; and
the resuming includes gradually increasing the volume of the outputting the continuous audio.

24. The storage medium of claim 21, wherein:
the pausing includes storing streamed data while pausing the outputting continuous audio; and
the resuming includes outputting continuous audio based on the stored streamed data.

25. The storage medium of claim 21, wherein the tag is associated with a beginning of a complete sentence, and resuming includes re-outputting the complete sentence that was interrupted by the pausing, the complete sentence being determined by the first application based on content indexing.

26. The storage medium of claim 21, wherein:
the outputting the continuous audio includes outputting the continuous audio and continuous video;
the identifying includes identifying a portion of the continuous audio and a portion of continuous video that was previously output to be re-output; and
the resuming includes resuming the outputting continuous audio and the continuous video, wherein the resuming includes re-outputting the portion of the continuous audio and the portion of the continuous video at a beginning of a most recent scene identified by the first application before the pausing, wherein the tag is associated with a beginning of the most recent scene is based on a change in video output.

27. The storage medium of claim 21, wherein the receiving the temporary interruption message includes receiving the temporary interruption message from the operating system based on a user input.

28. The storage medium of claim 21, wherein the receiving the temporary interruption message includes receiving the temporary interruption message from the operating system based on a navigation application run by the operating system.

29. The storage medium of claim 21, wherein the operating system includes a mobile phone operating system.

30. The storage medium of claim 21, wherein the resuming includes re-outputting a complete sentence of the continuous audio which was generated by the application before the pausing and was interrupted by the pausing.

31. A method comprising:
outputting, by a first application, continuous audio corresponding to a file read by the first application, wherein the first application is executing on a computing device, the continuous audio being based on content streamed from a sending device;
receiving, at the first application, an interruptive notification associated with a second application, wherein the interruptive notification corresponds to interrupting the continuous audio output by the first application;
pausing the outputting continuous audio by the first application based on receiving the interruptive notification, the pausing including sending a message to the sending device to pause or rewind the streamed content;
analyzing, by the first application, the continuous audio to identify a portion of the continuous audio that was previously output to be re-output;
outputting interruptive audio associated with the interruptive notification and the second application during the pausing; and
resuming the outputting continuous audio by the first application, the resuming including automatically re-outputting, without user interaction or instruction, the portion of the continuous audio identified by the first application beginning at a location associated with a most recent tag in the file read by the first application, wherein the most recent tag in the file read by the first application is included in the file from which the first application outputs the continuous audio.

32. The method of claim 31, wherein the pausing includes sending a message to the sending device to pause the streamed content.

33. The method of claim 31, wherein the pausing includes sending a message to the sending device to rewind the streamed content.

34. An apparatus comprising:
at least one processor; and
at least one memory comprising computer executable code that, when executed by the at least one processor, is configured to cause the apparatus to:
output, by a first application, continuous audio corresponding to a file read by the first application, wherein the first application is executed by the at least one processor, the continuous audio being based on content streamed from a sending device;
receive, at the first application, an interruptive notification associated with a second application, wherein the interruptive notification corresponds to interrupting the continuous audio output by the first application;
pause the outputting continuous audio by the first application based on receiving the interruptive notification, the pausing including sending a message to the sending device to pause or rewind the streamed content;
analyze, by the first application, the continuous audio to identify a portion of the continuous audio that was previously output to be re-output;
output interruptive audio associated with the interruptive notification and the second application during the pausing; and
resume the outputting continuous audio by the first application, the resuming including automatically re-outputting, without user interaction or instruction, the portion of the continuous audio identified by the first application beginning at a location associated with a most recent tag in the file read by the first application, wherein the most recent tag in the file read by the first application is included in the file from which the first application outputs the continuous audio.

35. The apparatus of claim 34, wherein the pausing includes sending a message to the sending device to pause the streamed content.

36. The apparatus of claim 34, wherein the pausing includes sending a message to the sending device to rewind the streamed content.

37. A non-transitory computer-readable storage medium comprising computer-executable code stored thereon that, when executed by a processor, is configured to cause a computing device to:
output, by a first application, continuous audio corresponding to a file read by the first application, wherein the first application is executing on the computing device, the continuous audio being based on content streamed from a sending device;
receive, at the first application, a temporary interruption message from an operating system executed by the processor, wherein the temporary interruption message corresponds to interrupting the continuous audio output by the first application;
pause the outputting the continuous audio based one receiving the temporary interruption message, the pausing including sending a message to the sending device to pause or rewind the streamed content;

analyze, by the first application, the continuous audio to identify a portion of the continuous audio that was previously output to be re-output;

output interruptive audio associated with the temporary interruption message during the pausing;

receive, by the first application, a resume message from the operating system; and resume outputting the continuous audio in response to receiving the resume message, the resuming including automatically re-outputting, without user interaction or instruction, the portion of the continuous audio identified by the first application beginning at a location associated with a most recent tag in the file read by the first application, wherein the most recent tag in the file read by the first application is included in the file from which the first application outputs the continuous audio.

38. The storage medium of claim 37, wherein the pausing includes sending a message to the sending device to pause the streamed content.

39. The storage medium of claim 37, wherein the pausing includes sending a message to the sending device to rewind the streamed content.

* * * * *